US012619355B2

(12) United States Patent
Wang et al.

(10) Patent No.: US 12,619,355 B2
(45) Date of Patent: May 5, 2026

(54) MACHINE LEARNING DATABASE MEMORY USE PREDICTION AND ADAPTATION

(71) Applicant: SAP SE, Walldorf (DE)

(72) Inventors: Xiaotao Wang, Xi'an (CN); Jing He, Xi'an (CN)

(73) Assignee: SAP SE, Walldorf (DE)

( * ) Notice: Subject to any disclaimer, the term of this patent is extended or adjusted under 35 U.S.C. 154(b) by 1022 days.

(21) Appl. No.: 17/748,145

(22) Filed: May 19, 2022

(65) Prior Publication Data

US 2023/0376202 A1 Nov. 23, 2023

(51) Int. Cl.
*G06F 3/06* (2006.01)
*G06N 3/044* (2023.01)

(52) U.S. Cl.
CPC .......... *G06F 3/0607* (2013.01); *G06F 3/0631* (2013.01); *G06F 3/0653* (2013.01); *G06F 3/0673* (2013.01); *G06N 3/044* (2023.01)

(58) Field of Classification Search
CPC .... G06F 3/0607; G06F 3/0631; G06F 3/0653; G06F 3/0673; G06F 2201/80; G06F 3/067; G06F 11/3034; G06F 11/3051; G06N 3/044; G06N 3/09; G06N 3/0442
See application file for complete search history.

(56) References Cited

U.S. PATENT DOCUMENTS

2010/0082507 A1    4/2010  Ganapathi et al.
2010/0082599 A1    4/2010  Graefe et al.

2010/0082602 A1    4/2010  Ganapathi et al.
2017/0068675 A1    3/2017  Hazel et al.
2018/0173429 A1 *  6/2018  Bonanno ............. G11C 11/4074
2018/0314735 A1    11/2018 Liu et al.
2020/0125568 A1    4/2020  Idicula et al.
2020/0195571 A1 *  6/2020  Srinivasan ............ G06F 3/0631
2020/0364561 A1 *  11/2020 Ananthanarayanan ......................
                                                    H04L 41/0843
2021/0004712 A1    1/2021  Sarferaz
2021/0201173 A1    7/2021  Arthanat et al.
2023/0036737 A1 *  2/2023  Carbon-Ogden .... G06N 3/0475
2023/0367762 A1 *  11/2023 Geib ...................... G06N 20/20

* cited by examiner

*Primary Examiner* — Peng Ke

(74) *Attorney, Agent, or Firm* — Fish & Richardson P.C.

(57) ABSTRACT

Methods, systems, and computer-readable storage media for machine learning database memory use prediction and adaptation. An example method includes determining a sampling interval for an application for sampling memory use by a database for the application. A plurality of historical memory use samples of amounts of memory used by the database are determined for the application based on the sampling interval. The plurality of historical memory use samples are provided for training of a machine learning model to predict memory use for the application by the database for a future time period. A set of current memory use samples are provided to the machine learning model and a memory use prediction for the application for an upcoming time period is received from the machine learning model. A determination is made as to whether to extend memory of the database for the application based on the memory use prediction.

17 Claims, 7 Drawing Sheets

Figure 4:
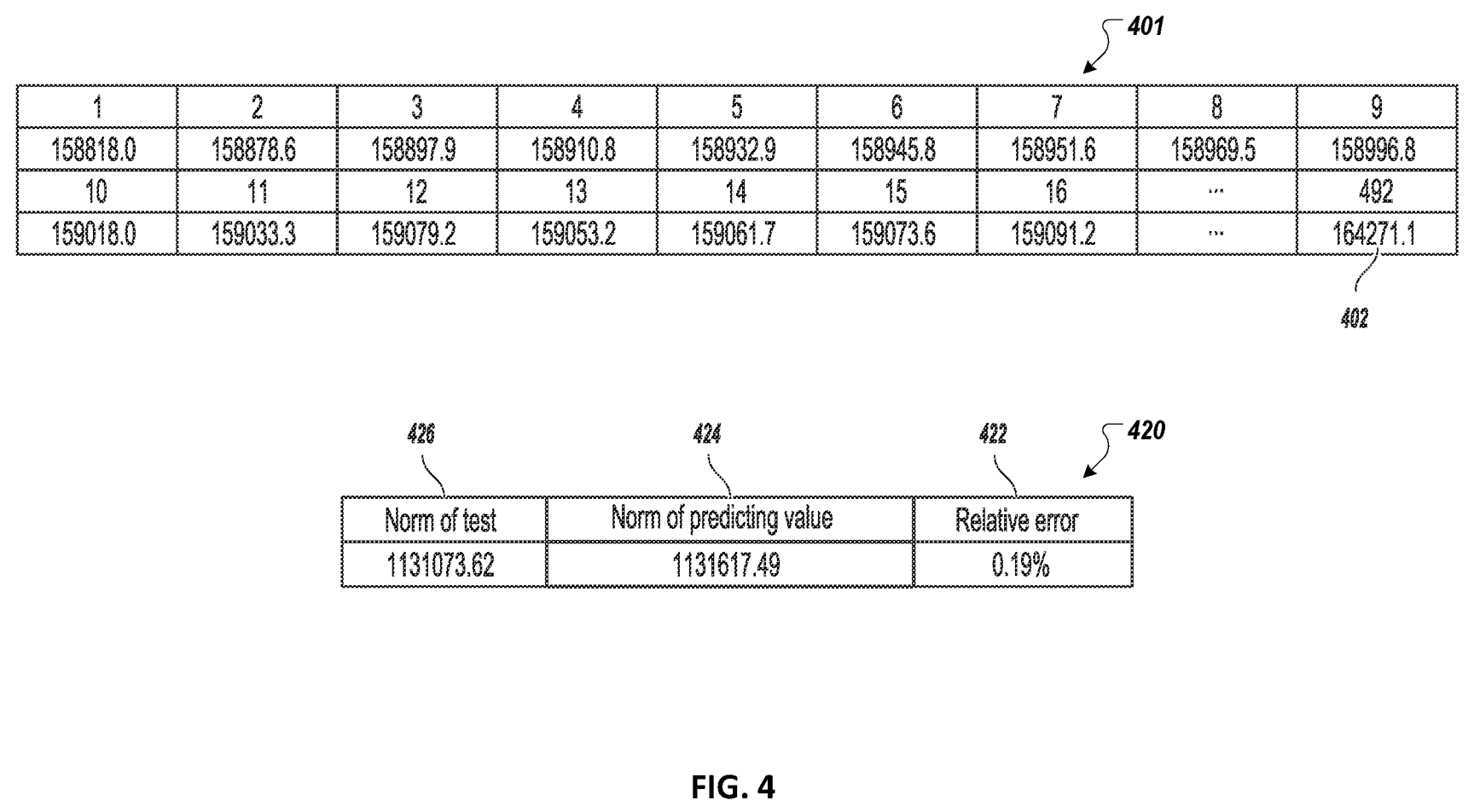

| 1 | 2 | 3 | 4 | 5 | 6 | 7 | 8 | 9 |
|---|---|---|---|---|---|---|---|---|
| 158818.0 | 158878.6 | 158897.9 | 158910.8 | 158932.9 | 158945.8 | 158951.6 | 158969.5 | 158996.8 |
| 10 | 11 | 12 | 13 | 14 | 15 | 16 | ... | 492 |
| 159018.0 | 159033.3 | 159079.2 | 159053.2 | 159061.7 | 159073.6 | 159091.2 | ... | 164271.1 |

401

402

| Norm of test | Norm of predicting value | Relative error |
|---|---|---|
| 1131073.62 | 1131617.49 | 0.19% |

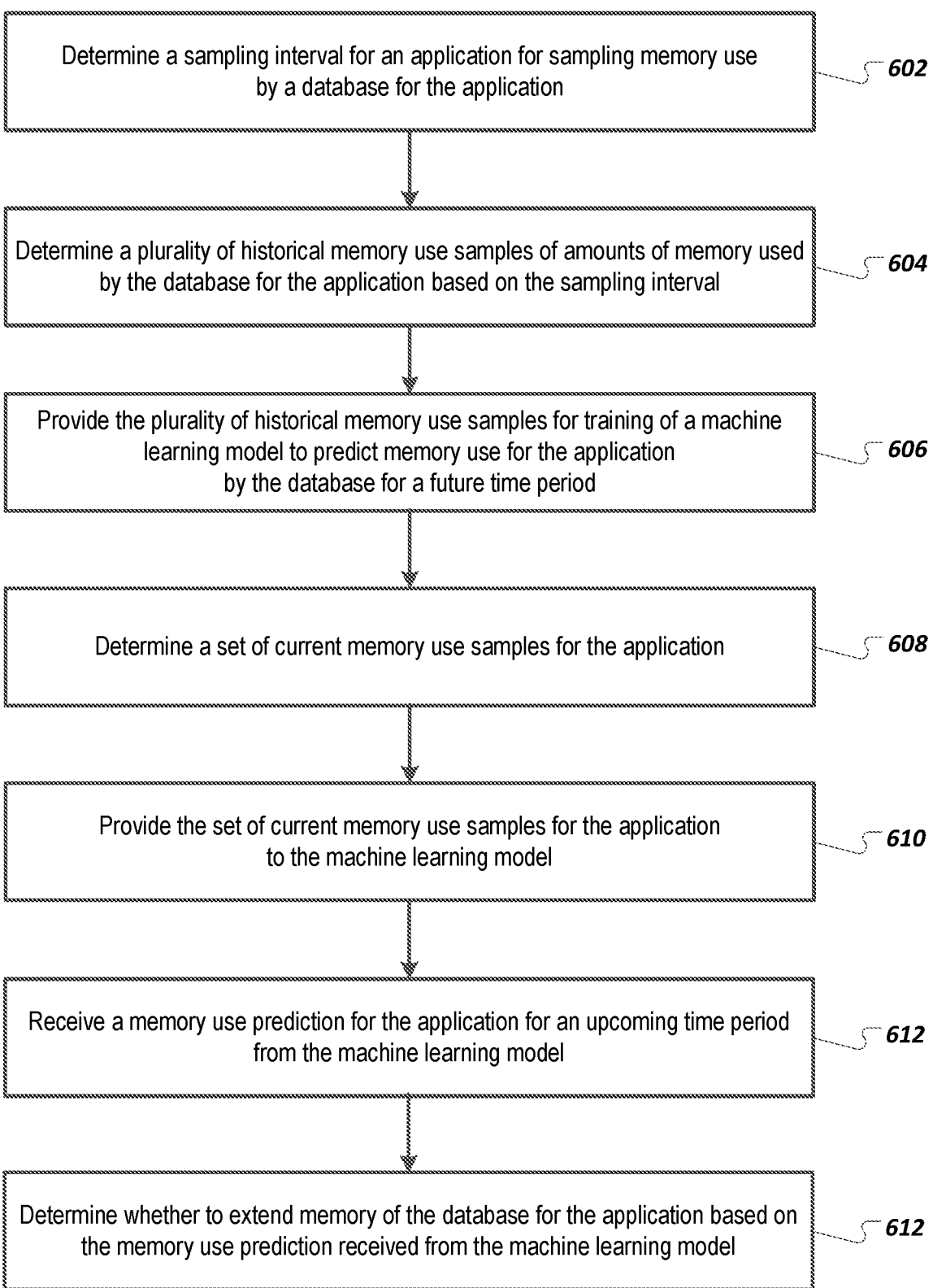

Determine a sampling interval for an application for sampling memory use by a database for the application ⌐ 602

Determine a plurality of historical memory use samples of amounts of memory used by the database for the application based on the sampling interval ⌐ 604

Provide the plurality of historical memory use samples for training of a machine learning model to predict memory use for the application by the database for a future time period ⌐ 606

Determine a set of current memory use samples for the application ⌐ 608

Provide the set of current memory use samples for the application to the machine learning model ⌐ 610

Receive a memory use prediction for the application for an upcoming time period from the machine learning model ⌐ 612

Determine whether to extend memory of the database for the application based on the memory use prediction received from the machine learning model ⌐ 612

FIG. 6     600

MACHINE LEARNING DATABASE MEMORY USE PREDICTION AND ADAPTATION

BACKGROUND

Database performance, such as for in-memory databases and other types of database, can be affected by an amount of configured memory made available to the database. Depending on application loads, memory usage by a database can fluctuate over different time periods. For some applications, application changes may cause an increase in demand for memory as compared to prior application versions.

SUMMARY

Implementations of the present disclosure are directed to machine learning database memory use prediction and adaptation.

In some implementations, actions include: determining a sampling interval for an application for sampling memory use by a database for the application; determining a plurality of historical memory use samples of amounts of memory used by the database for the application based on the sampling interval; providing the plurality of historical memory use samples for training of a machine learning model to predict memory use for the application by the database for a future time period; determining a set of current memory use samples for the application; providing the set of current memory use samples for the application to the machine learning model; receiving a memory use prediction for the application for an upcoming time period from the machine learning model; and determining whether to extend memory of the database for the application based on the memory use prediction received from the machine learning model. Other implementations of this aspect include corresponding systems, apparatus, and computer programs, configured to perform the actions of the methods, encoded on computer storage devices.

These and other implementations can each optionally include one or more of the following features. Determining whether to extend memory of the database for the application can include: determining a memory use threshold by the database for the application for the upcoming time period; comparing the memory use prediction to the memory use threshold; determining to extend the memory of the database in response to the memory use prediction at least meeting the memory use threshold; and determining to not extend the memory of the database in response to the memory use prediction not meeting the memory use threshold. The sampling interval can be based on a processing cycle of the application. A longer processing cycle can result in a longer sampling interval and a shorter processing cycle can result in a shorter sampling interval. The historical memory use samples and the current memory use samples can be obtained by querying a system table of the database. An actual memory use that occurs in the upcoming time period can be determined. The actual memory use can be compared to the memory use prediction to generate a prediction result for the upcoming time period and the prediction result can be used in a feedback loop to update the machine learning model. The machine learning model can be a Long Short Term Memory (LSTM) model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 4 is a diagram that illustrates example tables.

FIG. 6 depicts an example process that can be executed in accordance with implementations of the present disclosure.

Like reference symbols in the various drawings indicate like elements.

DETAILED DESCRIPTION

Figure 1:
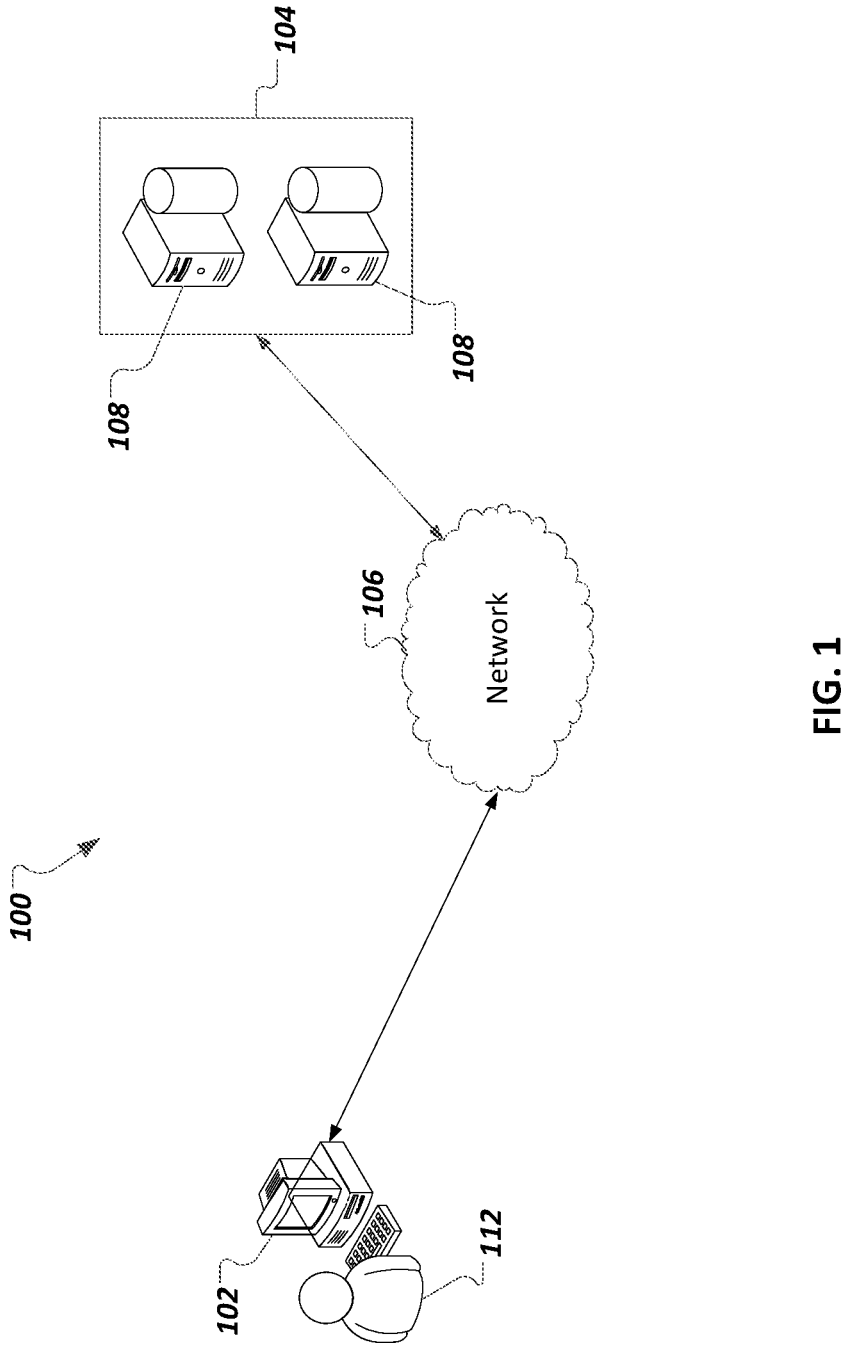
FIG. 1 depicts an example architecture that can be used to execute implementations of the present disclosure.

Implementations of the present disclosure are directed to machine learning automatic database memory use prediction and adaptation.

An in-memory database can provide performance advantages over other types of database systems that primarily use disk storage, for example. However, an in-memory database can use substantial amounts of memory. Additionally, memory loads can vary over time as data storage amounts and application requests change. Accordingly, demand for memory can continually grow and change over time, and changes in memory demand can be irregular with large fluctuations in demand for database capacity. In-memory databases can support large-scale and data-intensive industry applications, and robustness and responsiveness can be key for providing reliable application support. However, if a configured amount of available memory does not meet fluctuating demands of an in-memory database, undesirable effects can occur. For example, as an amount of free memory nears depletion, performance of the database system can degrade and database server resources may be inefficiently consumed, handling fewer requests as compared to a system that has a sufficient amount of free memory. As another example, a worst case can be that an available memory depletion results in a database server crash. With a crash, data loss can occur, and resources (e.g., processors) of the database server system can remain idle until the crash is resolved.

To avoid memory crashes, a machine learning based memory usage prediction scheme can be used. The machine learning based memory prediction can use a LSTM approach. For example, a time-cycling LSTM neural network model can be used that is capable of predicting time sequence events with relatively long intervals and delays. For example, the machine learning approach can handle relatively longer as well as relatively shorter application cycles, with an appropriate sampling interval selected based on specific application characteristics.

The machine learning approach can include different steps. For example, memory-related metrics of an in-memory database can be sampled, at a configured sampling interval, to prepare training data for a LSTM model. The LSTM model can then be trained using the training data. A portion of sampled data can be used to test the trained LSTM model. After the LSTM model is trained and tested, current metrics data can be sampled and provided as input to the trained LSTM model. The LSTM model can output a predicted memory usage that is predicted to occur, given the current metrics. If the predicted memory usage is at least a predetermined threshold, an amount of available memory can be extended.

The machine learning based memory prediction system can provide various technical advantages. For example, the system can be used to forecast dynamic memory variations, in advance, to enable proactive correction to avoid a database server crash. Expending resources to proactively avoid a crash can be more resource-efficient than expending resources to passively address a memory issue after a negative effect such as a crash occurs. Proactively avoiding negative incidents such as memory crashes can provide a more reliable and stable system. The automatic machine learning approach can be configured and used for regular, automatic database maintenance.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can include one or more databases 108. The databases 108 may be, for example, in-memory databases. As described in more detail below, the server system 104 can be configured for automatic database memory use prediction and adaptation using machine learning to automatically and dynamically adjust configured memory of the system 104 to preemptively avoid memory issues such as the server system 104 running out of memory, crashing due to low memory, etc.

Figure 2:
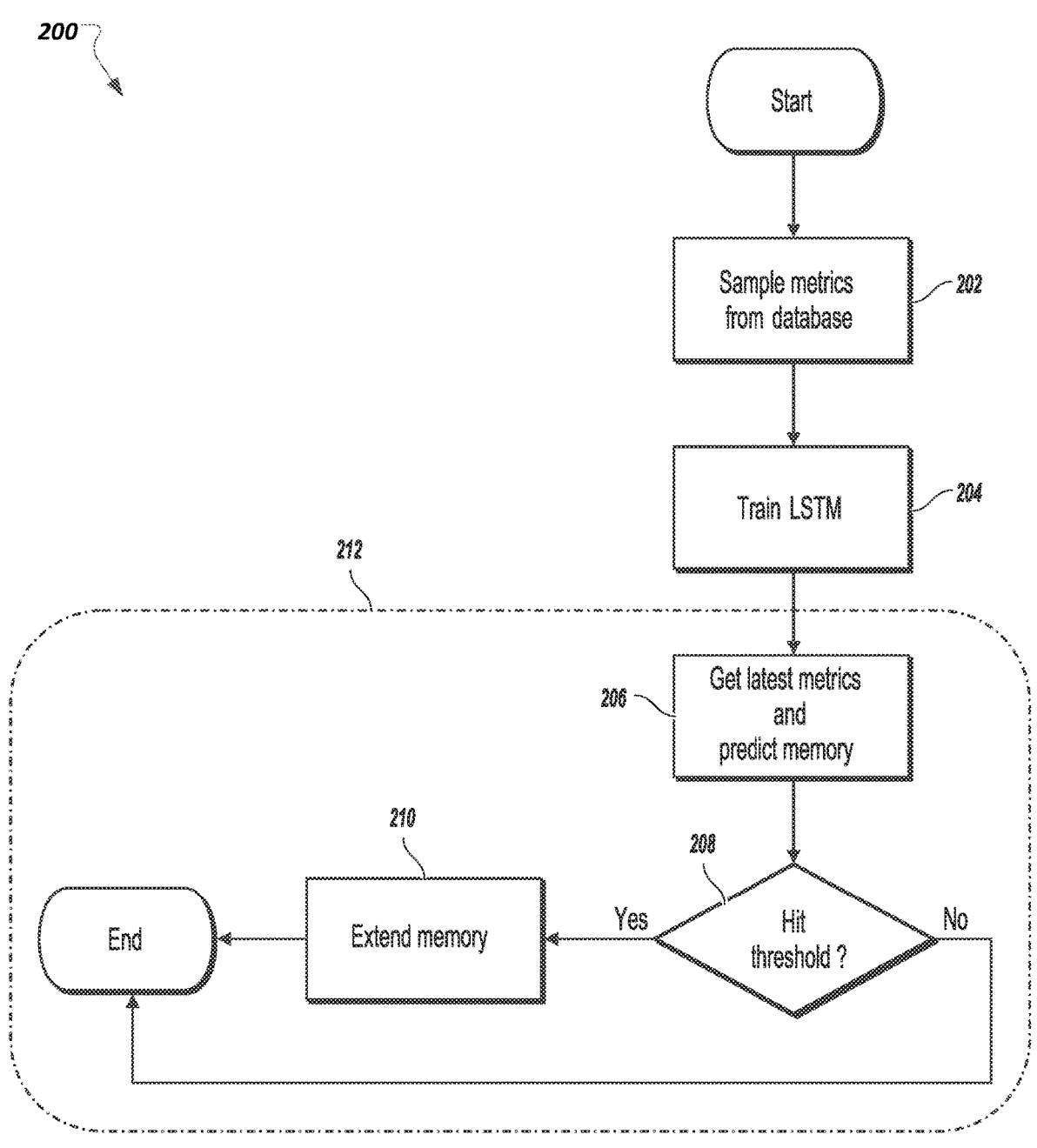
FIG. 2 depicts an example process that can be executed in accordance with implementations of the present disclosure.

FIG. 2 depicts an example process 200 that can be executed in accordance with implementations of the present disclosure. In some examples, the example process 200 is provided using one or more computer-executable programs executed by one or more computing devices. FIG. 2 illustrates an overview of processing for automatic database memory use prediction and adaptation. Further details are provided below with respect to FIGS. 3-5.

Metrics are sampled from a database (202). For example, metrics that indicate memory usage can be sampled using a particular sampling interval that can be based on a processing cycle length of an application for which the database is configured.

Sampled metrics are used to train a LSTM model (204). In some cases, a portion of the sampled metrics are used for testing the LSTM model after the LSTM model is trained.

Latest metrics are retrieved and used by the LSTM model to generate predicted memory usage for the database (206).

A determination is made as to whether the predicted memory usage is at least a predetermined threshold (208). The predetermined threshold can be predetermined (or determined periodically, as described below).

If the predicted memory usage is at least the predetermined threshold, one or more actions are taken to extend (e.g., increase) memory available for the database (210).

A processing block 212 that includes the steps 206, 208, and 210 can be repeated over time. For example, memory use can be predicted (and appropriate memory extension performed, as needed) after each sampling interval. Further details of the process 200, including details on retraining the LSTM model, are described below with respect to FIG. 3.

Figure 3:
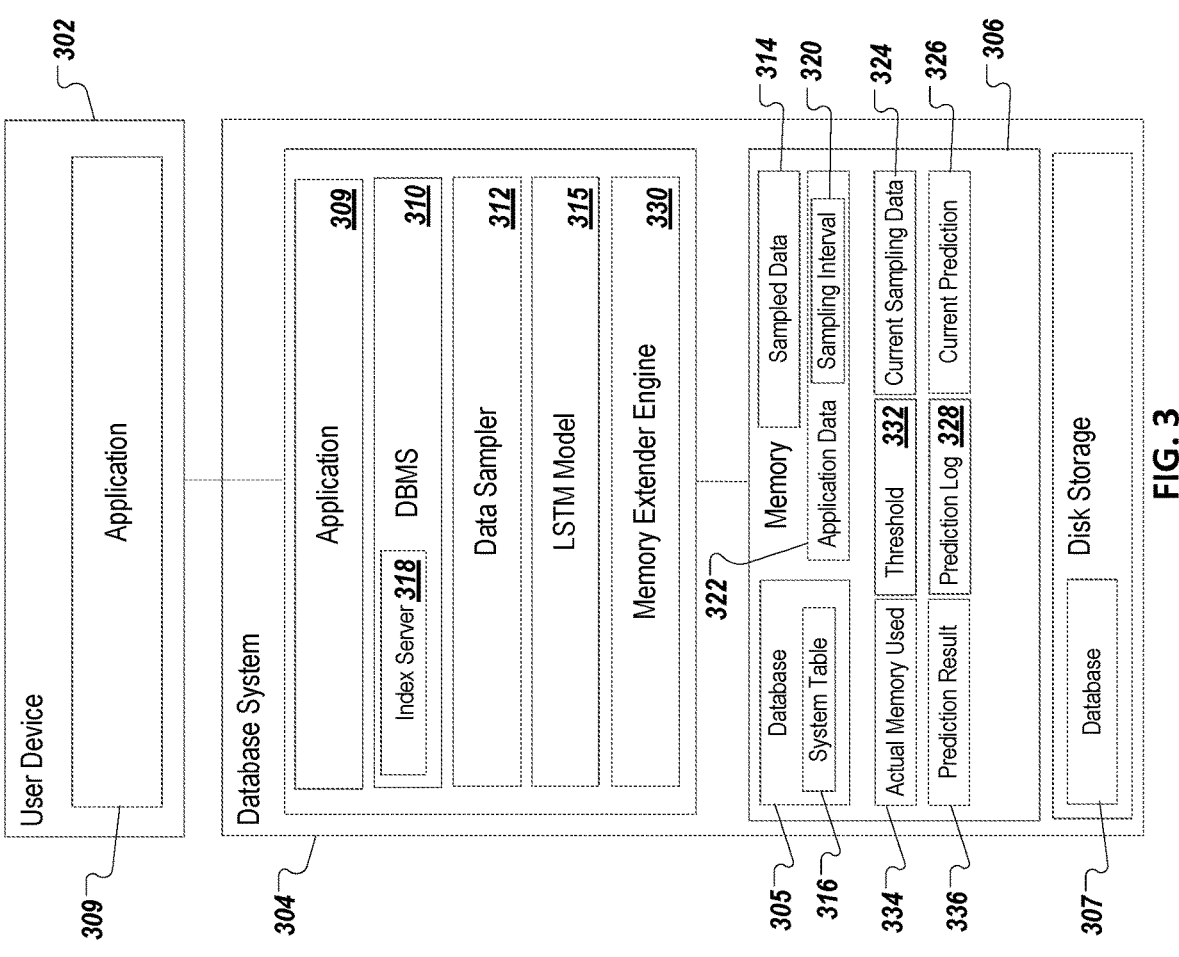
FIG. 3 depicts an example conceptual architecture in accordance with implementations of the present disclosure.

FIG. 3 depicts an example conceptual architecture 300 in accordance with implementations of the present disclosure. In the depicted example, the conceptual architecture 300 includes a user device 302 and a database system 304. The database system 304 can include a database 305, which can be an in-memory database, for example, stored in memory 306. The database 305 can have a disk backup 307.

The user device 302 includes a client application 308. The client application 308 can be configured to submit requests to the database system 304. Client requests from the client application 308 can be received and processed by a server application 309. The server application 309 can submit or forward database query requests for the client application (or for the server application itself 309) to a DBMS (DataBase Management System) 310. The DBMS 310 can submit one or more queries to the database 305, on behalf of the server application 309, and provide query results to the server application 309. The server application 309 can forward results to the client application 308 as appropriate.

The database system 304 can include other components that are configured to perform automatic database memory use prediction and adaptation for the database 305. For example, a data sampler 312 can sample memory-use metrics for the database to generate sampled data 314. A LSTM model 315 can be trained using the sampled data 314. The data sampler 312 can generate the sampled data 314 by sampling metrics from a system table 316 of the database 305, for example.

In some implementations, a proxy for database memory usage can be memory used by an index server process 318. Memory used by the index server process 318 can account for nearly all of the memory used by the database 305, so in some implementations, memory used by the index server process 318 can represent memory usage of the database 305. In some implementations, the database 305 is configured to serve the server application 309, so memory used by the index server process 318 can also be a proxy for database-related memory used by the server application 309, for example.

Memory used by the index server process 318 can be determined by querying the system table 316. In some implementations, memory used by the index server process 318 can be obtained using the following query, where a unit of a returned value is megabytes:

> select round(heap_memory_used size/1024/1024,1) as heap_used_in_mb from m_service_memory where service_name='indexserver'

The data sampler 312 can generate the sampled data 314 using a sampling interval 320. The sampling interval 320 is a time between sampling points. The data sampler 312 can sample data at multiple sampling points to generated enough sampled data 314 to train the LSTM model 315, for example. The sampling interval 320 can be included in, or derived by application data 322, for example. The application data 322 can be for the server application 309, for example. That is, the sampling interval 320 can be application-specific, based on application data 322 such as a processing cycle length. For example, some applications may have a monthly processing cycle and other applications may have a processing cycle that is shorter or longer than one month. The sampling interval 320 can be based on the processing cycle length for the server application 309, such that a longer processing cycle length results in a longer sampling interval 320 and a shorter processing cycle length results in a shorter sampling interval 320.

The data sampler 312 can determine a number of samples to include in the sampled data 314 for a given sampling run, for sufficient training of the LSTM model 315. For example, the data sampler 312 can determine (or can be configured) to generate 500 sample points for training the LSTM model 315. In some cases, the sampling interval 320 can be determined based on a total number of desired samples and a sampling time (e.g., where the sampling time can be equal to or at least based on the processing cycle length of the server application 309 (e.g., the sampling time can be configured to be at least the processing cycle length)). For instance, if a minimum total number of desired samples is 500 and if the total sampling time is two months, a sampling interval can be calculated using a formula of:

$$2 \text{ months} * \frac{30 \text{ days}}{\text{month}} * \frac{24 \text{ hours}}{\text{day}} * \frac{60 \text{ minutes}}{\text{hour}} \Big/ 500 = 172.8 \text{ minutes}.$$

The data sampler 312 can thus use a sampling interval 320 of a value that is equal to or less than 172.8 minute, for this example. In some cases, the data sampler 312 generates some or all of the sampled data 314 by querying historical data in the system table 316 (e.g., by adding a date predicate to the above example query to filter data by certain date periods). In other cases, the data sampler 312 generates some or all of the sampled data 314 by querying current data in the system table 316 (e.g., without filtering retrieved data by a date predicate).

As mentioned, the sampled data 314 can be used to train the LSTM model 315. The LSTM model 315 is a type of RNN (Recurrent Neural Network) model. The LSTM model 315 can be used rather than other types of models due to the LSTM model 315 being suitable for dealing with and predicting time sequence events with relatively long intervals and delays. The LSTM model 315 can be trained, using the sampled data 314, to predict future memory usage. In some cases, a certain percentage (e.g., 90%) of the sampled data 314 can be used to train the LSTM model 315 and a remainder portion of the sampled data 314 (e.g., 10%) can be used to test the LSTM model 315 after training has occurred.

After the LSTM model 315 is trained, the data sampler 312 can determine current sampling data 324 and provide the current sampling data 324 as input to the trained LSTM model 315. The trained LSTM model 315 can use the current sampling data 324 to generate a current prediction 326 for upcoming memory usage for the database 305. The current prediction 326 can be stored in a prediction log 328.

A memory extender engine 330 can determine whether to extend memory for the database 305, based on the current prediction 326 and a threshold 332. The threshold 332 can be a static value that is a value obtained from experience that represents a value of memory use, that if exceeded, can cause problems (at least based on current workload) for the database 305. In some cases, the threshold 332 is based on a current amount of physical memory. For example, the threshold can be set to an effective allocation unit which can correspond to a certain percentage (e.g., 85%) of physical memory (e.g., with remaining memory for use by operating system and other processes).

The memory extender engine 330 can determine that memory should be extended if the current prediction 326 is at least the threshold 332. For instance, in the above example, if the current prediction 326 of memory use for an upcoming time period is 910 GB and the threshold is 990 GB, the memory extender engine 330 can determine that the memory 306 does not need to be extended. As another example, if the current prediction 326 of memory use for an upcoming time period is 996 GB and the threshold is 990 GB, the memory extender engine 330 can determine that the memory 306 should be extended.

Extending the memory 306 (e.g., making more memory available to the database 305) can be performed in various ways. Some approaches can include automatic action by the memory extender engine 330. For example, more memory can be made available to a particular database instance, container instance, etc., that is configured for the database 305. As another example, additional resources (e.g., database instance(s), servers, containers) can be assigned or configured to serve the database 305. As another example, additional memory can be installed, e.g., in a hot (e.g., live) installation that does not interrupt operation of the database 305.

After the current prediction 326 has been generated for a future time point or upcoming time period, the memory extender engine 330 can measure, at the future time point or in the upcoming time period, actual memory used 334 by the database 305. The memory extender engine 330 can generate a prediction result 336 for the current prediction 326 by comparing the actual memory used 334 to the current prediction 326. In some cases the prediction result 336 is a true or false value. For example, if actual memory used 334 is within a certain percentage of the current prediction 326, the prediction result 336 can be a true value and if the actual memory used 334 is not within the certain percentage of the current prediction 326, the prediction result 336 can be a false value. In other implementations, the prediction result 336 represents a prediction error percentage that indicates how closely the current prediction 326 is to the actual memory used 334. The prediction result 336 can be provided to the LSTM model 315 as part of a feedback loop for updating the LSTM model 315.

In general, the LSTM model 315 can be retrained over time to maintain a certain level of prediction accuracy. In some cases, retraining can occur to maintain a certain predefined ratio (e.g., 10%) of prediction sequence length (e.g., a time period for which the current prediction 326 applies) to a sampling length. For example, if a sampling time is two months, the LSTM model 315 can be used to predict memory values for an upcoming time period of a length that is calculated using the following formula:

$$2 \text{ months} * \frac{30 \text{ days}}{\text{month}} * 10\% = 6 \text{ days}$$

In this example, the LSTM model 315 can be retrained every six days.

As another example, the LSTM model 315 can be retrained in response to a certain number of prediction results 336 indicating at least a certain prediction error. For example, the LSTM model 315 can be retrained if five consecutive prediction results 336 indicate at least a 5% prediction error.

FIG. 4 is a diagram 400 that illustrates example tables. A table 401 illustrates example sampled data. The table 401 includes example sampled data sampled by an automatic database memory use prediction and adaptation system during a case study. A case study of a performance test that simulates a sell of stock process can be used to evaluate the system, for example.

The table 401 illustrates example 492 samples taken using a sampling interval of 10 minutes, over a sampling period of 82 hours. A $492^{nd}$ sample 402, for example, has a value of 164271.1 MB of memory. The samples illustrated in the table 401 were used to train a LSTM model, as described above. For example, 90% of the samples can be used for training the LSTM model and 10% can be used for testing the trained model.

A table 420 show results of using the trained LSTM model during the case study. A relative prediction error 422 of 0.19% can be calculated based on comparing a prediction norm 424 for the case study to actual test memory values 426 recorded during the case study. The relative prediction error 422 can be calculated using the below formula:

$$\frac{\|test - predict\|_2}{\|test\|_2}$$

Figure 5:
FIG. 5 illustrates an example graph of predicted and actual memory usage values.

FIG. 5 illustrates an example graph 500 of predicted and actual memory usage values. The graph 500 plots predicted and actual memory usage sizes (in megabytes (MB)) over time. As noted in a legend item 502, predicted heap memory amounts, including a predicted amount 504 of 161800 MB for a time point 506, are plotted on a line 508. Similarly, as noted in a legend item 510, actual heap memory amounts, including an actual amount 512 of 161750 for the time point 506, are plotted on a line 514. As can be seen in the graph 500, the line 508 of predicted memory amounts is similar for most time points to the line 514 of actual memory amounts.

FIG. 6 depicts an example process 600 that can be executed in accordance with implementations of the present disclosure. In some examples, the example process 600 is provided using one or more computer-executable programs executed by one or more computing devices.

A sampling interval is determined for an application for sampling memory use by a database for the application (602). The sampling interval can be based on a processing cycle of the application. For example, a longer processing cycle can result in a longer sampling interval and a shorter processing cycle can result in a shorter sampling interval.

A plurality of historical memory use samples of amounts of memory used by the database are determined for the application based on the sampling interval (604). For example, the historical memory use samples can be obtained by querying a system table of the database.

The plurality of historical memory use samples are provided for training of a machine learning model to predict memory use for the application by the database for a future time period (606). The machine learning model can be a LSTM model.

A set of current memory use samples are determined for the application (608).

The set of current memory use samples for the application are provided to the machine learning model (610).

A memory use prediction for the application for an upcoming time period is received from the machine learning model (612).

A determination is made as to whether to extend memory of the database for the application based on the memory use prediction received from the machine learning model (614). For example, a memory use threshold can be determined for the application for the upcoming time period. The memory use threshold can be a predetermined amount of memory use that may be problematic given the current amount of available memory, for example. The memory use prediction can be comparted to the memory use threshold. A determination can be made to extend the memory of the database in response to the memory use prediction at least meeting the memory use threshold. A determination can be made to not extend the memory of the database in response to the memory use prediction not meeting the memory use threshold.

Figure 7:
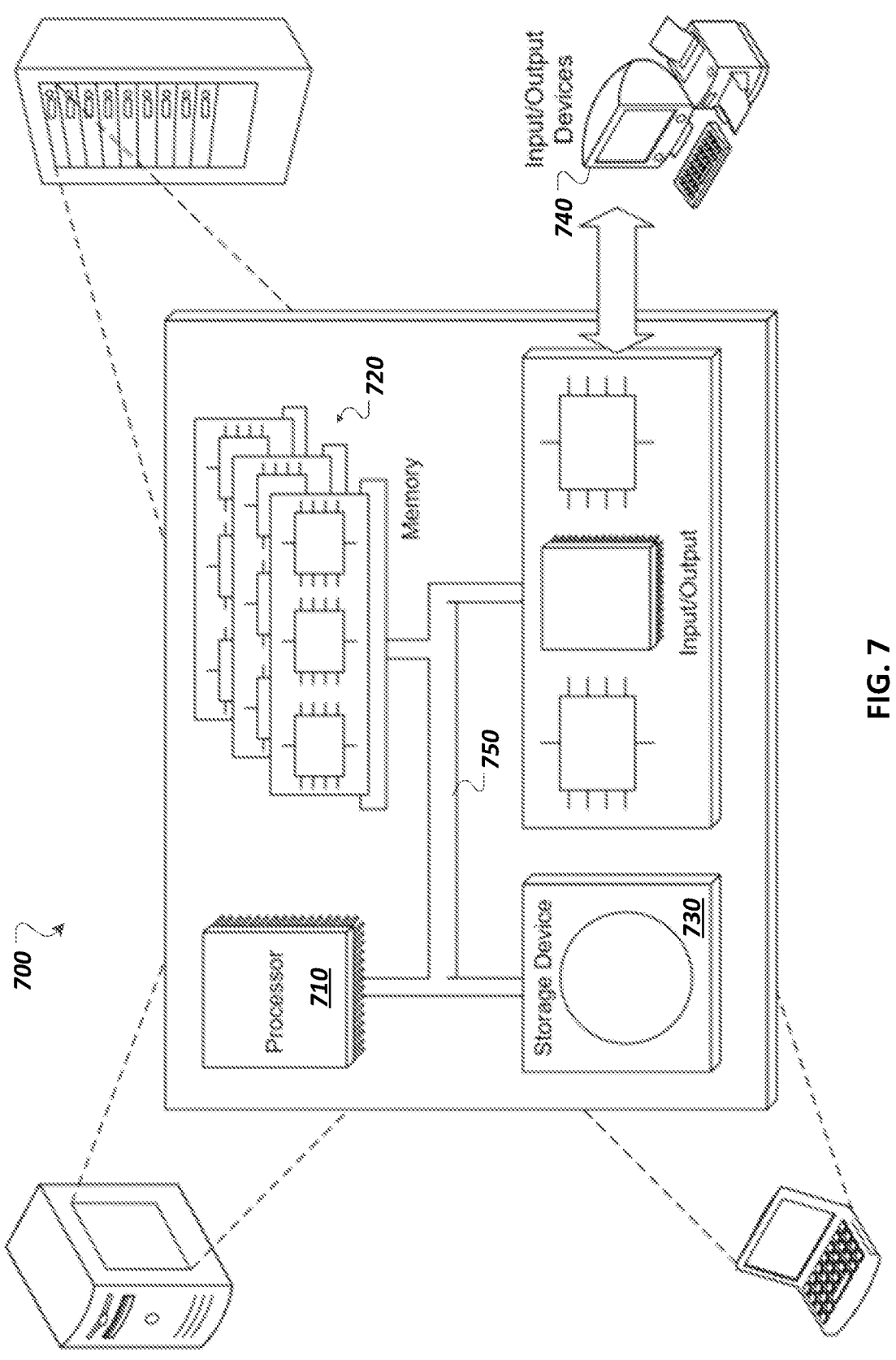
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor.

The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for machine learning database memory use prediction and adaptation, comprising:
   determining a sampling interval for an application for sampling memory use by a database for the application;
   determining a plurality of historical memory use samples of amounts of memory used by the database for the application based on the sampling interval;
   providing the plurality of historical memory use samples for training of a machine learning model to predict memory use for the application by the database for a future time period;
   determining, based on the sampling interval and a predefined prediction accuracy level, a machine learning model retraining interval;
   determining a set of current memory use samples for the application;
   providing the set of current memory use samples for the application to the machine learning model;
   receiving a memory use prediction for the application for an upcoming time period from the machine learning model;
   determining whether to extend memory of the database for the application based on the memory use prediction received from the machine learning model;
   determining an actual memory use for the application that occurs in the upcoming time period;
   comparing the actual memory use to the memory use prediction to generate a prediction result for the upcoming time period; and retraining the machine learning model, using the prediction result and after the machine learning model retraining interval has elapsed, to maintain a prediction accuracy of the machine learning model at least at the predefined prediction accuracy level.

2. The computer-implemented method of claim 1, wherein determining whether to extend memory of the database for the application comprises:

determining a memory use threshold by the database for the application for the upcoming time period;

comparing the memory use prediction to the memory use threshold;

determining to extend the memory of the database in response to the memory use prediction at least meeting the memory use threshold; and determining to not extend the memory of the database in response to the memory use prediction not meeting the memory use threshold.

3. The computer-implemented method of claim 1, wherein the sampling interval is based on a processing cycle of the application.

4. The computer-implemented method of claim 3, wherein a longer processing cycle results in a longer sampling interval and a shorter processing cycle results in a shorter sampling interval.

5. The computer-implemented method of claim 1, wherein the historical memory use samples and the current memory use samples are obtained by querying a system table of the database.

6. The computer-implemented method of claim 1, wherein the machine learning model is a long short term memory (LSTM) model.

7. A non-transitory computer-readable storage medium coupled to one or more processors and having instructions stored thereon which, when executed by the one or more processors, cause the one or more processors to perform operations for machine learning database memory use prediction and adaptation, the operations comprising:

determining a sampling interval for an application for sampling memory use by a database for the application;

determining a plurality of historical memory use samples of amounts of memory used by the database for the application based on the sampling interval;

providing the plurality of historical memory use samples for training of a machine learning model to predict memory use for the application by the database for a future time period;

determining, based on the sampling interval and a predefined prediction accuracy level, a machine learning model retraining interval;

determining a set of current memory use samples for the application;

providing the set of current memory use samples for the application to the machine learning model;

receiving a memory use prediction for the application for an upcoming time period from the machine learning model;

determining whether to extend memory of the database for the application based on the memory use prediction received from the machine learning model;

determining an actual memory use for the application that occurs in the upcoming time period;

comparing the actual memory use to the memory use prediction to generate a prediction result for the upcoming time period; and retraining the machine learning model, using the prediction result and after the machine learning model retraining interval has elapsed, to maintain a prediction accuracy of the machine learning model at least at the predefined prediction accuracy level.

8. The computer-readable storage medium of claim 7, wherein determining whether to extend memory of the database for the application comprises:

determining a memory use threshold by the database for the application for the upcoming time period;

comparing the memory use prediction to the memory use threshold;

determining to extend the memory of the database in response to the memory use prediction at least meeting the memory use threshold; and determining to not extend the memory of the database in response to the memory use prediction not meeting the memory use threshold.

9. The computer-readable storage medium of claim 7, wherein the sampling interval is based on a processing cycle of the application.

10. The computer-readable storage medium of claim 9, wherein a longer processing cycle results in a longer sampling interval and a shorter processing cycle results in a shorter sampling interval.

11. The computer-readable storage medium of claim 7, wherein the historical memory use samples and the current memory use samples are obtained by querying a system table of the database.

12. The computer-readable storage medium of claim 7, wherein the machine learning model is a long short term memory (LSTM) model.

13. A system, comprising:

a computing device; and a computer-readable storage device coupled to the computing device and having instructions stored thereon which, when executed by the computing device, cause the computing device to perform operations for machine learning database memory use prediction and adaptation, the operations comprising:

determining a sampling interval for an application for sampling memory use by a database for the application;

determining a plurality of historical memory use samples of amounts of memory used by the database for the application based on the sampling interval;

providing the plurality of historical memory use samples for training of a machine learning model to predict memory use for the application by the database for a future time period;

determining, based on the sampling interval and a predefined prediction accuracy level, a machine learning model retraining interval;

determining a set of current memory use samples for the application;

providing the set of current memory use samples for the application to the machine learning model;

receiving a memory use prediction for the application for an upcoming time period from the machine learning model;

determining whether to extend memory of the database for the application based on the memory use prediction received from the machine learning model;

determining an actual memory use for the application that occurs in the upcoming time period;

comparing the actual memory use to the memory use prediction to generate a prediction result for the upcoming time period; and retraining the machine learning model, using the prediction result and after the machine learning model retraining interval has elapsed, to maintain a prediction accuracy of the machine learning model at least at the predefined prediction accuracy level.

14. The system of claim 13, wherein determining whether to extend memory of the database for the application comprises:

determining a memory use threshold by the database for the application for the upcoming time period;

comparing the memory use prediction to the memory use threshold;

determining to extend the memory of the database in response to the memory use prediction at least meeting the memory use threshold; and determining to not extend the memory of the database in response to the memory use prediction not meeting the memory use threshold.

15. The system of claim 13, wherein the sampling interval is based on a processing cycle of the application.

16. The system of claim 15, wherein a longer processing cycle results in a longer sampling interval and a shorter processing cycle results in a shorter sampling interval.

17. The system of claim 13, wherein the historical memory use samples and the current memory use samples are obtained by querying a system table of the database.

\* \* \* \* \*